United States Patent
Kwak et al.

(10) Patent No.: US 7,912,135 B2
(45) Date of Patent: Mar. 22, 2011

(54) METHOD AND TRANSMISSION APPARATUS FOR ALLOCATING RESOURCES TO TRANSMIT UPLINK PACKET DATA IN AN ORTHOGONAL FREQUENCY DIVISION MULTIPLEXING SYSTEM

(75) Inventors: Yong-Jun Kwak, Yongin-si (KR); Sung-Ho Choi, Suwon-si (KR); Joon-Young Cho, Suwon-si (KR); Ju-Ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1280 days.

(21) Appl. No.: 11/472,549

(22) Filed: Jun. 22, 2006

(65) Prior Publication Data

US 2007/0009054 A1    Jan. 11, 2007

(30) Foreign Application Priority Data

Jun. 22, 2005   (KR) ................ 10-2005-0054083

(51) Int. Cl.
 *H04K 1/10* (2006.01)
 *H04L 27/28* (2006.01)
(52) U.S. Cl. .................................................... 375/260
(58) Field of Classification Search .............. 375/225, 375/227, 259, 260, 267, 346, 224, 229, 261, 375/295, 296, 299, 340; 370/335, 336, 337, 370/342, 203, 208, 210, 252, 329, 333, 344, 370/441, 465; 455/407, 408, 440, 441, 436, 455/449, 450, 452.2
See application file for complete search history.

(56) References Cited

U.S. PATENT DOCUMENTS

| 5,726,978 | A * | 3/1998 | Frodigh et al. ............... 370/252 |
| 5,956,642 | A * | 9/1999 | Larsson et al. ............... 455/449 |
| 6,751,444 | B1 | 6/2004 | Meiyappan |
| 6,795,424 | B1 | 9/2004 | Kapoor et al. |
| 2001/0038630 | A1 * | 11/2001 | Tong et al. ................... 370/395 |
| 2002/0159425 | A1 * | 10/2002 | Uesugi et al. ................ 370/342 |

(Continued)

FOREIGN PATENT DOCUMENTS

JP      2003-174426 A      6/2003

(Continued)

OTHER PUBLICATIONS

Future Broad band Packet Radio Access and Its Field Experiments by (Mamoru Sawahashi, iroyuki Atarashi, and Kenichi Higuchi). IP Radio Network Development Department, NTT DoCoMo, Inc. The paper is from the first 2005 conference with a date of Jun. 19-23, 2005 in dresden, Germany.*

(Continued)

*Primary Examiner* — David C Payne
*Assistant Examiner* — Syed Haider
(74) *Attorney, Agent, or Firm* — Roylance, Abrams, Berdo and Goodman L.L.P.

(57) ABSTRACT

Provided is a resource allocation method that considers frequency scheduling gain and frequency diversity gain when uplink packet data is transmitted in a wireless communication system based on Orthogonal Frequency Division Multiplexing (OFDM). A method is provided in which Localized Frequency Division Multiple Access (LFDMA) technology capable of obtaining the frequency scheduling gain and Distributed Frequency Division Multiple Access (DFDMA) technology capable of obtaining the frequency diversity gain are mixed. A method is provided which signals sub-carrier sets mapped to the DFDMA and LFDMA, to terminals.

24 Claims, 13 Drawing Sheets

U.S. PATENT DOCUMENTS

| | | | | |
|---|---|---|---|---|
| 2003/0128658 A1* | 7/2003 | Walton et al. | ................ | 370/208 |
| 2003/0169681 A1* | 9/2003 | Li et al. | ................ | 370/203 |
| 2006/0119492 A1* | 6/2006 | Kim | ................ | 341/143 |
| 2006/0209669 A1* | 9/2006 | Nishio | ................ | 370/208 |
| 2006/0262871 A1* | 11/2006 | Cho et al. | ................ | 375/260 |

FOREIGN PATENT DOCUMENTS

| | | |
|---|---|---|
| JP | 2008-546316 A | 12/2008 |
| RU | 2 192 094 C1 | 10/2002 |
| WO | WO-2007-119415 A | 10/2007 |

OTHER PUBLICATIONS

Cheong Yui Wong, Roger S. Cheng, "Multiuser OFDM with Adaptive Subcarrier, Bit, and Power Allocation", IEEE journal on selected areas in communications, vol. 17, No. 10, Oct. 1999, pp. 1747-1758.*

Wong et al., "Multiuser OFDM with Adaptive Subcarrier, Bit, and Power Allocation", IEEE Journal on Selected Areas in Communications, vol. 17, No. 10, Oct. 1999, pp. 1747-1758.

*Physical Channels and Multiplexing in Evolved UTRA Uplink*, NTT DoCoMo, Jun. 20, 2005, pp. 1-21, R1-050591, 3GPP TSG RAN WG1 Ad Hoc on LTE, Sophia Antipolis, France.

*Unlink Multiple Access Scheme*, LG Electronics, Jun. 20, 2005, pp. 2-9, R1-050638, 3GPP TSG RAN WG1 Ad Hoc on LTE, Sophia Antipolis, France.

*EUTRA Uplink Numerology and Design*, Motorola, Jun. 20, 2005, pp. 1-7, R1-050584, 3GPP RAN1#41bis, Sophia Antipolis, France.

*Unlink Transmission and Multiplexing for EUTRA*, Samsung, Jun. 20, 2005, pp. 1-5, R1-050605, 3GPP TSG RAN WG1 Ad Hoc on LTE, Sophia-Antipolis, France.

* cited by examiner

METHOD AND TRANSMISSION APPARATUS FOR ALLOCATING RESOURCES TO TRANSMIT UPLINK PACKET DATA IN AN ORTHOGONAL FREQUENCY DIVISION MULTIPLEXING SYSTEM

CROSS-REFERENCE TO RELATED PATENT APPLICATION

This application claims the benefit under 35 U.S.C. §119(a) of Korean Patent Application No. 2005-54083, filed Jun. 22, 2005, in the Korean Intellectual Property Office, the entire disclosure of which is hereby incorporated by reference.

BACKGROUND OF THE INVENTION

1. Field of the Invention

The present invention relates to the allocation of resources to transmit uplink packet data in an Orthogonal Frequency Division Multiplexing (OFDM) system. More particularly, the present invention relates to a method and apparatus for allocating resources by considering frequency scheduling gain and frequency diversity gain when uplink packet data is transmitted in a wireless communication system based on OFDM.

2. Description of the Related Art

Research is ongoing on an Orthogonal Frequency Division Multiplexing (OFDM) scheme useful for high-speed data transmission in a radio channel of a mobile communication system.

An OFDM scheme for transmitting multi-carrier data is a type of multi-carrier modulation scheme. In an OFDM scheme a serial to parallel conversion process is performed for a symbol stream. The parallel signals are then modulated into multiple orthogonal sub-carriers such as multiple orthogonal sub-carrier channels. The orthogonal sub-carrier channels are then transmitted.

FIG. 1 is a block diagram illustrating a structure of a transmitter for a conventional OFDM system.

Referring to FIG. 1, the OFDM transmitter is provided with an encoder 101, a modulator 102, a Serial to Parallel Converter (SPC) 103, an Inverse Fast Fourier Transform (IFFT) processor 104, a Parallel to Serial Converter (PSC) 105, and a Cyclic Prefix (CP) inserter 106.

The encoder 101 is a channel-coding device. The encoder 101 receives an information bit stream and performs a channel coding process for the received information bit stream.

Conventionally, the encoder 101 uses either a convolutional encoder, a turbo encoder, a Low Density Parity Check (LDPC) encoder, or the like.

The modulator 102 performs a modulation process such as Quadrature Phase Shift Keying (QPSK), 8-Phase Shift Keying (8PSK), 16-Quadrature Amplitude Modulation (16QAM), or the like.

Although not illustrated in FIG. 1, a rate matcher could be inserted to perform repetition or puncturing between the encoder 101 and the modulator 102. The SPC 103 receives the output of the modulator 102 and generates parallel signals.

The IFFT processor 104 receives the output of the SPC 103 and performs an IFFT process. The PSC 105 serially converts the output of the IFFT processor 104. The CP inserter 106 inserts a CP into an output signal of the PSC 105.

In the IFFT processor 104, frequency domain data is input and time domain data is output. Because the conventional OFDM system processes input data in the frequency domain, there is a drawback in that a Peak to Average Power Ratio (PAPR) increases when the IFFT processor 104 transforms the frequency domain data into the time domain data.

The PAPR is an important factor considered in an uplink transmission. When the PAPR value increases, the cell coverage decreases. Efforts for reducing the PAPR value have focused on the uplink transmission so as to not increase the cost of terminals for the system. In the uplink transmission based on OFDM, a multiplexing scheme that is modified from the conventional OFDM scheme can be exploited. That is, a method can be exploited which can process data in the time domain without processing data in the frequency domain. For example, data could be processed in the time domain without a channel coding or modulation.

FIG. 2 is a block diagram illustrating a transmitter of the OFDM system based on the modified uplink transmission scheme.

Referring to FIG. 2, the OFDM transmitter is provided with an encoder 201, a modulator 202, an SPC 203, a Fast Fourier Transform (FFT) processor 204, a mapper 205, an IFFT processor 206, a PSC 207, and a CP inserter 208.

The encoder 201 receives an information bit stream and performs a channel coding process for the received information bit stream. The modulator 202 performs a modulation process such as QPSK, 8PSK, 16QAM, or the like. As described above, a rate matcher could be inserted between the encoder 201 and the modulator 202 of FIG. 2. The SPC 203 receives the output of the modulator 202 and generates parallel signals. The FFT processor 204 receives the output of the SPC 203 and performs an FFT process. The mapper 205 maps the output of the FFT processor 204 to the input of the IFFT processor 206. The IFFT processor 206 performs an IFFT process. The PSC 207 serially converts the output of the IFFT processor 206. The CP inserter 208 inserts a CP into an output signal of the PSC 207.

FIG. 3 is a block diagram illustrating an operation of the mapper of FIG. 2. The operation of the mapper will be described with reference to FIG. 3.

Data symbols 301 for which the channel coding or modulation has been performed are input to an FFT processor 204. The output of the FFT processor 204 is mapped by the mapper 205 (not shown) before being input to the IFFT processor 206. The output 305 of the IFFT processor 206 is input to the PSC 207.

The mapper 205 maps a signal 303 that was transformed from the time domain to the frequency domain by the FFT processor 204 to an input position of the IFFT processor 304, such that the signal 303 could be carried on a proper sub-carrier.

When the output of the FFT processor 204 is successively mapped to an input part of the IFFT processor 206 in the mapping process, successive sub-carriers are used on the frequency domain. This is referred to as Localized Frequency Division Multiple Access (LFDMA).

Furthermore, when the output of the FFT processor 204 is mapped to the input part of the IFFT processor 206 while maintained in an arbitrary equal interval, equal-interval sub-carriers are used on the frequency domain. This is referred to as Interleaved Frequency Division Multiple Access (IFDMA) or Distributed Frequency Division Multiple Access (DFDMA). Hereinafter, both the IFDMA and DFDMA are referred to as the DFDMA.

FIG. 4 illustrates a comparison between positions of sub-carriers of the DFDMA and LFDMA in the frequency domain.

As indicated by reference numeral 401 of FIG. 4, sub-carriers for terminals using the DFDMA are positioned in an equal interval in the entire frequency domain. As indicated by reference numeral 402 of FIG. 4, sub-carriers for terminals using the LFDMA are successively positioned in a portion of the frequency domain.

The LFDMA and DFDMA schemes have the following unique characteristics.

By exploiting a partial frequency bandwidth with successive sub-carriers for the entire system frequency bandwidth, the LFDMA scheme can select the partial frequency bandwidth with a high channel gain in a frequency selective channel whose variation is significant in the frequency bandwidth and then transmit data through the selected bandwidth. Thereby frequency scheduling gain is achieved.

On the other hand, the DFDMA scheme can obtain various channel gains by exploiting multiple sub-carriers distributed over a wide bandwidth, thereby obtaining frequency diversity gain.

Thus, if channel gains on a frequency bandwidth-by-frequency bandwidth basis are known by a base station, frequency scheduling can be first be considered for an uplink transmission of a slow terminal. Thereby, better performance can be achieved when LFDMA is used. Even when channel gains on the frequency bandwidth-by-frequency bandwidth basis are not known by the base station, better performance can be achieved by exploiting DFDMA. Whereby, DFDMA is capable of increasing the frequency diversity gain in an uplink transmission of a fast terminal for which channel gain information is incorrect.

In the uplink transmission, the system allocates some resources to a terminal of the uplink transmission through uplink resource scheduling and allows the terminal to perform the uplink transmission. According to a resource scheduling and allocation method, the performance at an uplink transmission time is affected.

To increase the uplink performance as described above, uplink resources are allocated to a terminal capable of increasing the frequency diversity gain such that the DFDMA scheme is used, and are allocated to a terminal capable of increasing the frequency scheduling gain such that the LFDMA scheme is used. Accordingly, the base station must make due consideration in scheduling for the selection of DFDMA or LFDMA according to each terminal.

Accordingly, there is a need for a method and apparatus that can efficiently allocate resources at an uplink transmission time by mixing a Distributed Frequency Division Multiple Access (DFDMA) scheme and a Localized Frequency Division Multiple Access (LFDMA) scheme.

SUMMARY OF THE INVENTION

Exemplary embodiments of the present invention address at least the above problems and/or disadvantages and provide at least the advantages described below. Accordingly, an aspect of the present invention is to provide a method and apparatus that can efficiently allocate resources at an uplink transmission time by mixing a Distributed Frequency Division Multiple Access (DFDMA) scheme and a Localized Frequency Division Multiple Access (LFDMA) scheme.

In accordance with an exemplary aspect of the present invention, there is provided a resource allocation method for an uplink packet data transmission in a wireless communication system based on Orthogonal Frequency Division Multiplexing (OFDM), comprising the steps of allocating uplink resources from a base station to a plurality of terminals on a frequency bandwidth-by-frequency bandwidth basis; mapping the allocated resources to equal-interval sub-carriers or successive sub-carriers depending on a state of each of the plurality of terminals; generating resource allocation information indicating the mapped resources for each terminal from the base station; and transmitting the generated resource allocation information from the base station to each terminal using a scheduling assignment channel, wherein the resource allocation information comprises an index (I) of a first sub-carrier allocated to each terminal, an interval (R) between sub-carriers, and the number (N) of sub-carriers.

In accordance with another exemplary aspect of the present invention, there is provided a resource allocation method for an uplink packet data transmission in a wireless communication system based on Orthogonal Frequency Division Multiplexing (OFDM), comprising the steps of allocating uplink resources from a base station to a plurality of terminals on a frequency bandwidth-by-frequency bandwidth basis; mapping the allocated resources to equal-interval sub-carriers or successive sub-carriers by considering a state of each of the plurality of terminals; generating resource allocation information indicating the mapped resources for each terminal from the base station; and transmitting the generated resource allocation information from the base station to each terminal using a scheduling assignment channel, wherein the resource allocation information comprises a length (L) of a frequency block comprising multiple sub-carriers on which data is transmitted, an index (B) of the frequency block allocated to each terminal, an interval (R) between sub-carriers and an index (I) of a first sub-carrier within the frequency block allocated to each terminal.

In accordance with another exemplary aspect of the present invention, there is provided a resource allocation method for an uplink packet data transmission in a wireless communication system based on Orthogonal Frequency Division Multiplexing (OFDM), comprising the steps of dividing frequency resources into a Distributed Frequency Division Multiple Access (DFDMA) frequency set and a Localized Frequency Division Multiple Access (LFDMA) frequency set and performing settings, wherein each of the DFDMA and LFDMA frequency sets comprise a plurality of frequency blocks and each of the plurality of frequency blocks comprise a plurality of sub-carriers; allocating sub-carriers of the DFDMA frequency set or the LFDMA frequency set from a base station to each of a plurality of terminals; and transmitting resource allocation information relative to allocated resources from the base station to each of the plurality of terminal using a scheduling assignment channel.

In accordance with another exemplary aspect of the present invention, there is provided an apparatus for transmitting uplink packet data in a wireless communication system based on Orthogonal Frequency Division Multiplexing (OFDM), comprising an uplink resource allocator for allocating uplink resources from a base station to a plurality of terminal on a frequency bandwidth-by-frequency bandwidth basis; a resource allocation information generator for mapping the allocated resources to equal-interval sub-carriers or successive sub-carriers depending on a state of each of the plurality of terminals and generating resource allocation information indicating the mapped resources for each of the plurality of terminals; an encoder for encoding the resource allocation information; and a transmitter for transmitting the encoded resource allocation information to each of the plurality of terminals using a scheduling assignment channel, wherein the resource allocation information comprises an index (I) of a first sub-carrier allocated to each terminal, an interval (R) between sub-carriers, and the number (N) of sub-carriers.

In accordance with another exemplary aspect of the present invention, there is provided an apparatus for transmitting uplink packet data in a wireless communication system based on Orthogonal Frequency Division Multiplexing (OFDM), comprising an uplink resource allocator for allocating uplink resources from a base station to a plurality of terminals on a frequency bandwidth-by-frequency bandwidth basis; a resource allocation information generator for mapping the allocated uplink resources to equal-interval sub-carriers or successive sub-carriers depending on a state of each of the plurality of terminals, and generating resource allocation information indicating the mapped resources; an encoder for encoding the resource allocation information; and a transmitter for transmitting the encoded resource allocation information to each of the plurality of terminals using a scheduling assignment channel, wherein the resource allocation information comprises a length (L) of a frequency block comprising multiple sub-carriers on which data is transmitted, an index (B) of the frequency block allocated to each of the plurality of terminals, an interval (R) between sub-carriers and an index (I) of a first sub-carrier within the frequency block allocated to each of the plurality of terminals.

In accordance with yet another exemplary aspect of the present invention, there is provided an apparatus for transmitting uplink packet data in a wireless communication system based on Orthogonal Frequency Division Multiplexing (OFDM), comprising a resource allocator for dividing frequency resources into a Distributed Frequency Division Multiple Access (DFDMA) frequency set and a Localized Frequency Division Multiple Access (LFDMA) frequency set and performing settings, wherein each of the frequency sets comprises a plurality of frequency blocks and each of the plurality of frequency blocks comprises a plurality of sub-carriers; a resource allocation information generator for allocating sub-carriers of the DFDMA frequency set or the LFDMA frequency set to each of a plurality of terminals and generating resource allocation information indicating the mapped resources for each of the plurality of terminals; an encoder for encoding the resource allocation information; and a transmitter for transmitting the encoded resource allocation information to each of the plurality of terminals using a scheduling assignment channel.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention propose a method for efficiently allocating uplink resources in an uplink transmission using Distributed Frequency Division Multiple Access (DFDMA) and Localized Frequency Division Multiple Access (LFDMA) in a wireless communication system based on Orthogonal Frequency Division Multiplexing (OFDM).

Exemplary embodiments of the present invention are configured with two methods.

The first method allocates resources without dividing frequency parts for DFDMA and LFDMA, and supports the DFDMA and LFDMA. That is, DFDMA and LFDMA are simultaneously supported in one allocation method. In this method resources could be flexibly allocated.

The second method divides frequency parts for DFDMA and LFDMA through pre-settings, and allocates resources to terminals using DFDMA and LFDMA in the divided frequency parts. In this method signaling overhead could be reduced for resource allocation.

First Exemplary Embodiment

A first method based on flexible resource allocation in accordance with the first exemplary embodiment is described below.

In the first exemplary embodiment, a base station schedules signal resources allocated to a terminal in the same way, regardless of DFDMA and LFDMA.

Figure 1:
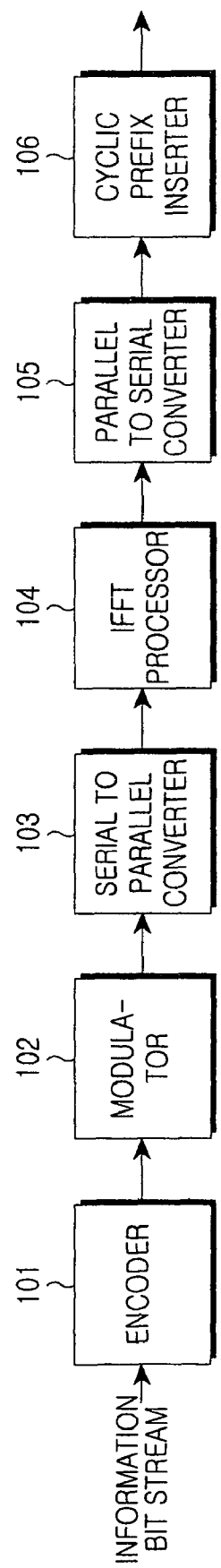
FIG. 1 is a block diagram illustrating a structure of a transmitter for a conventional Orthogonal Frequency Division Multiplexing (OFDM) system.
Figure 2:
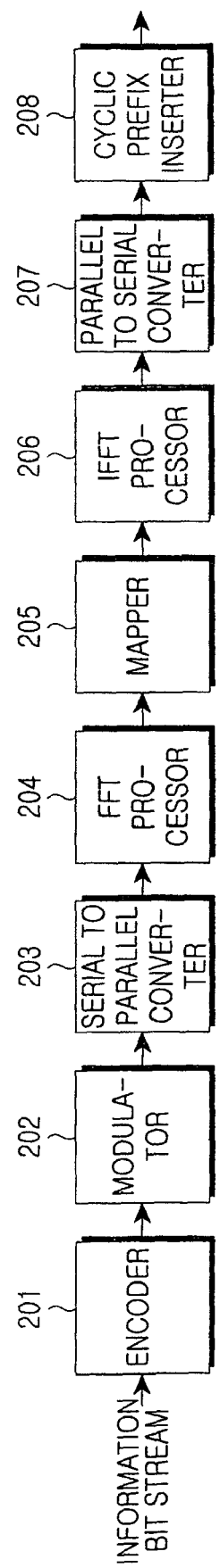
FIG. 2 is a block diagram illustrating a structure of a transmitter of an OFDM system based on a modified uplink transmission scheme.
Figure 3:
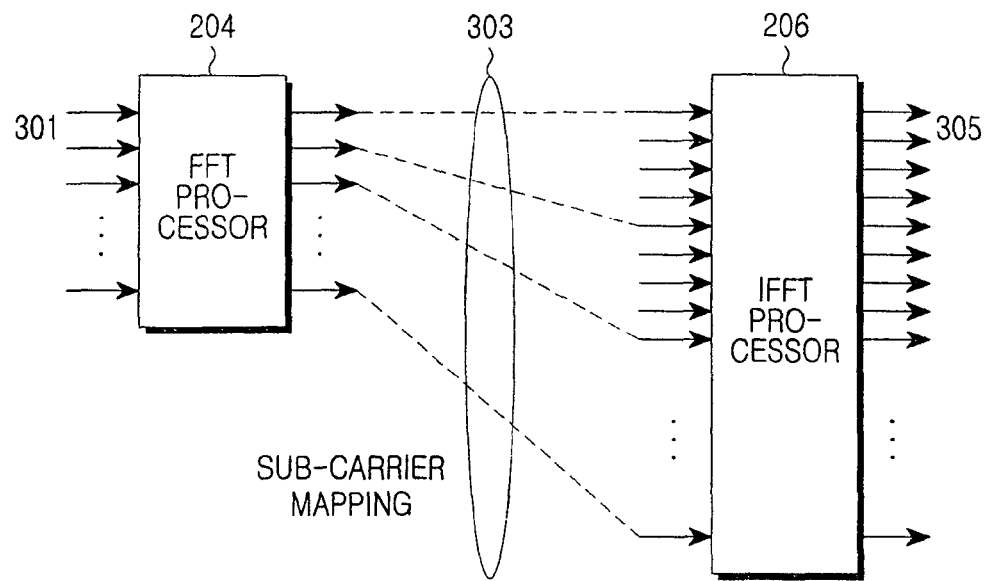
FIG. 3 is a block diagram illustrating an operation of a mapper of FIG. 2.
Figure 4:
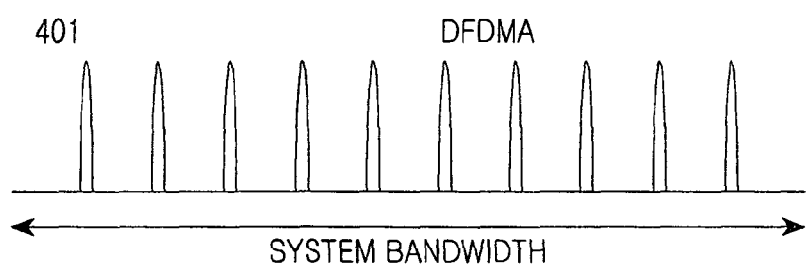
FIG. 4 illustrates a comparison between positions of sub-carriers of Distributed Frequency Division Multiple Access (DFDMA) and Localized Frequency Division Multiple Access (LFDMA) in a frequency domain.
Figure 4:
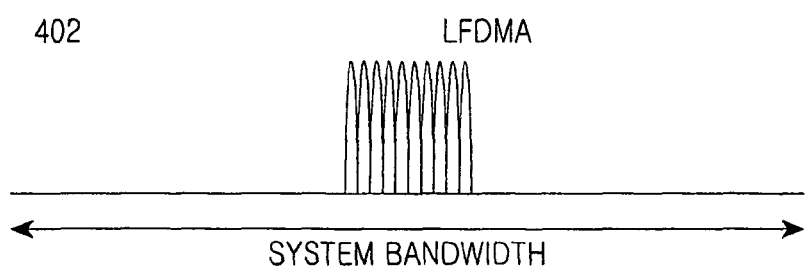
Figure 5:
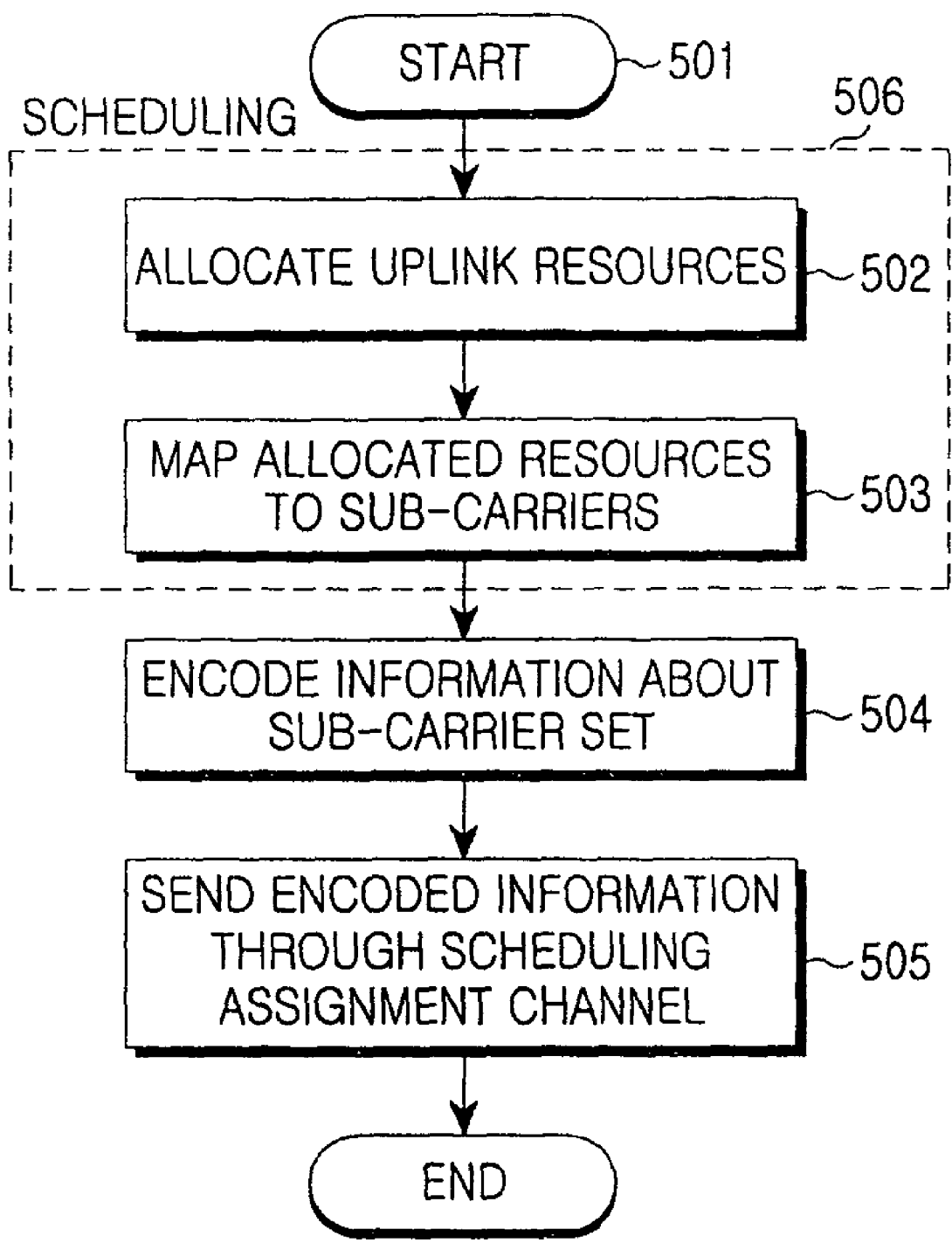
FIG. 5 is a flowchart illustrating a process for allocating uplink resources scheduled by a base station for an uplink transmission of a terminal, in accordance with a first exemplary embodiment of the present invention.

FIG. 5 is a flowchart illustrating a process for allocating uplink resources scheduled by the base station for an uplink transmission of a terminal, in accordance with the first exemplary embodiment of the present invention. An uplink resource allocation process in accordance with the first exemplary embodiment will be described below with reference to FIG. 5.

When the uplink transmission is required (Step 501), the base station allocates uplink (UL) resources to each terminal (Step 502). Subsequently, the base station considers terminal states and maps the allocated uplink resources to possible sub-carriers (Step 503).

At this time, resources allocated to a terminal using the DFDMA are mapped to equal-interval sub-carriers, and resources allocated to a terminal using the LFDMA are mapped to successive sub-carriers. Steps 502 and 503 correspond to a scheduling process 506 of the base station.

The base station encodes information about a set of sub-carriers mapped to the uplink resources through a coding process (Step 504), and then transmits the encoded information to each terminal through a scheduling assignment channel (Step 505).

A process for encoding the information about the sub-carrier set in step 504, in accordance with the first exemplary embodiment, can be divided into various methods considering the flexibility of resource allocation and signaling overhead.

First Example of First Exemplary Embodiment

Figure 6:
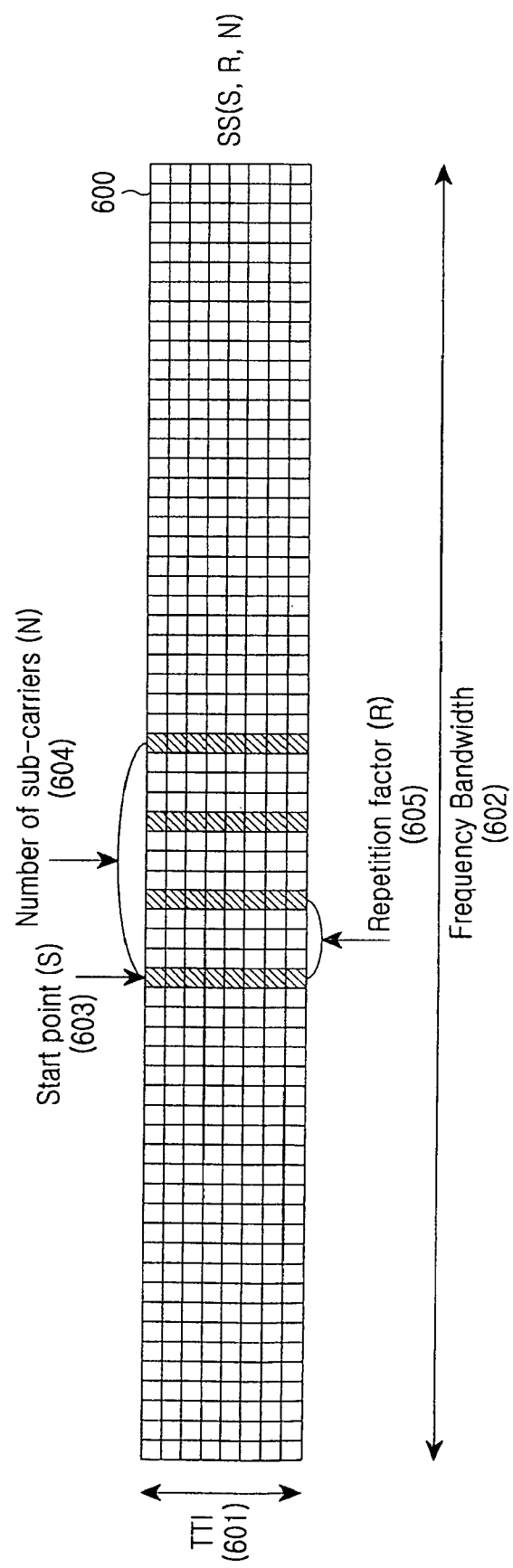
FIG. 6 illustrates a first example of the first exemplary embodiment.

FIG. 6 illustrates a first example of the first exemplary embodiment.

Reference numeral 600 denotes uplink resources in the time and frequency domains. In the time domain, a time units are designated as indicated by reference number 601 and is used as a scheduling unit. One or more OFDM symbols can be set in one time unit.

Furthermore, a frequency bandwidth is configured with multiple sub-carriers as indicated by reference numeral 602. In other words, the base station signals a set of allocated sub-carriers to each terminal in every time unit. The sub-carrier set is signaled using an interval between a sub-carrier of a start point (S) 603 and a subsequent sub-carrier, a repetition factor (R) 605, and the number of sub-carriers (N) 604.

In terms of the resource set allocated to an arbitrary terminal, the interval between sub-carriers, R, is set to one value. Thus, with DFDMA, using equal-interval sub-carriers can be supported. When an equal interval is set to a value of 1, LFDMA using successive sub-carriers can be supported.

Thus, one method can support both the DFDMA and the LFDMA.

For convenience, a sub-carrier set is denoted by SS(S, R, N), where "S" is an index of the first sub-carrier, "R" is an interval between sub-carriers, and "N" is the number of allocated sub-carriers.

Figure 7:
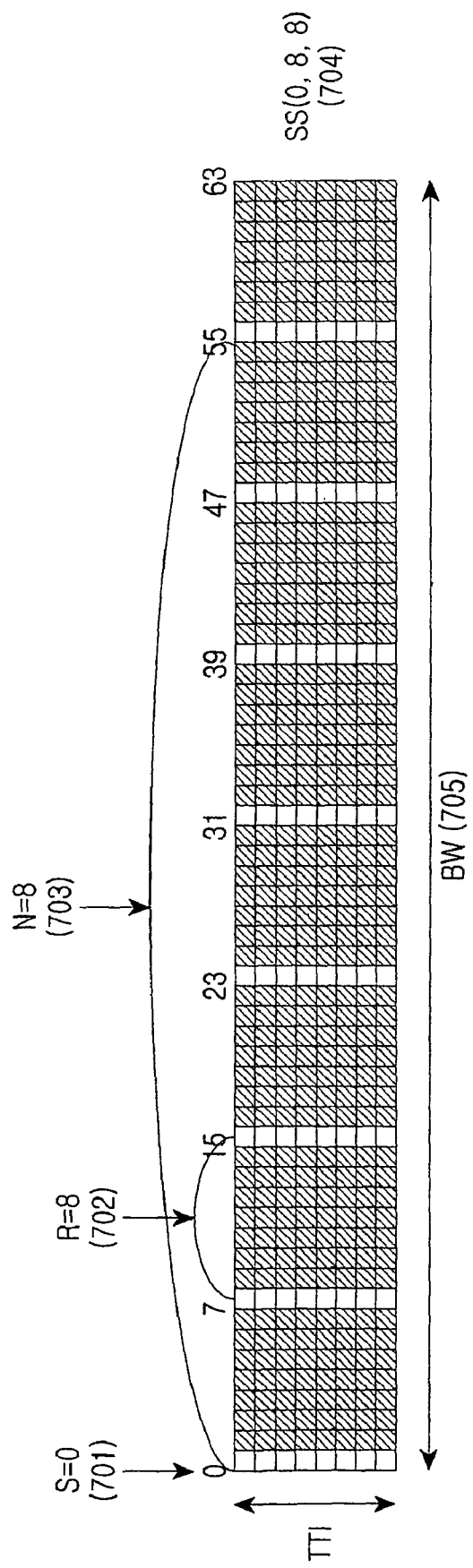
FIGS. 7 and 8 illustrate examples of expressing a sub-carrier set using the first example of the first exemplary embodiment.
Figure 8:
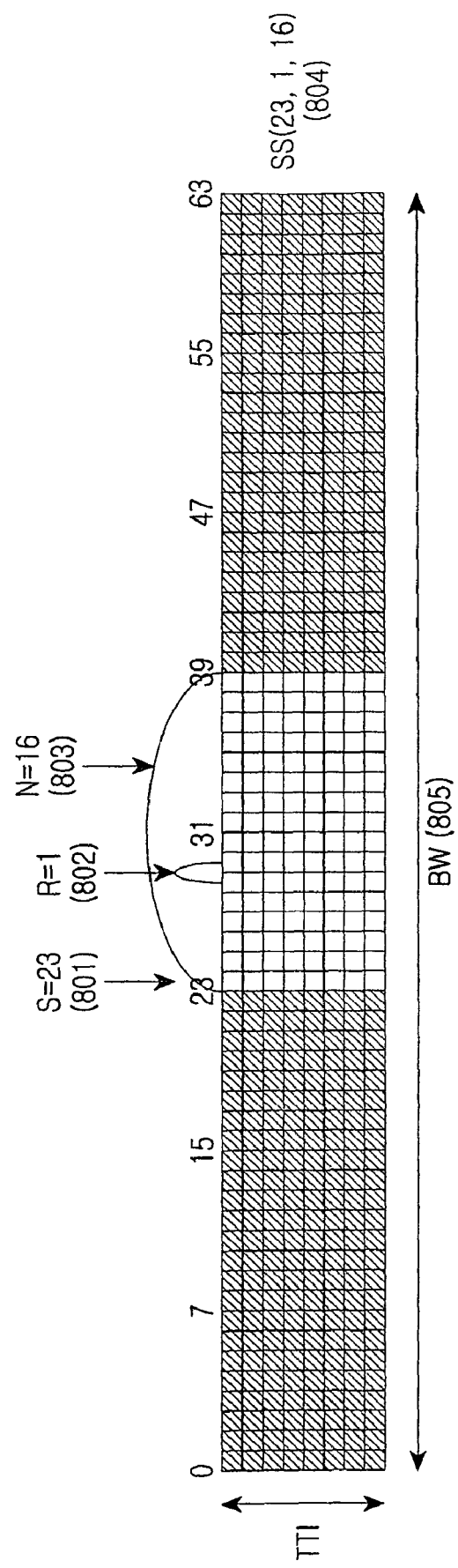

FIGS. 7 and 8 illustrate examples of expressing a sub-carrier set using the first example of the first exemplary embodiment.

FIG. 7 illustrates an example of using DFDMA in a given frequency bandwidth 705.

As indicated by reference numeral 701 of FIG. 7, the first sub-carrier of used sub-carriers is the 0-th sub-carrier (S=0). As indicated by reference numeral 702, R=8 since an interval between sub-carriers is 8. As indicated by reference numeral 703, N=8 since the number of used sub-carriers is 8. As a result, a sub-carrier set is expressed by SS(0, 8, 8) as indicated by reference numeral 704.

FIG. 8 illustrates an example of using LFDMA in a given frequency bandwidth 805.

As indicated by reference numeral 801 in FIG. 8, the first sub-carrier of used sub-carriers is the 23rd sub-carrier (S=23). As indicated by reference numeral 802, R=1 since an interval between sub-carriers is 1 in the LFDMA. As indicated by reference numeral 803, N=16 since the number of used sub-carriers is 16. As a result, a sub-carrier set is expressed by SS(23, 1, 16) as indicated by reference numeral 804.

Three information elements S, R, and N for expressing the sub-carrier set as described above can used for all cases. When the S, R, or N value is set such that all values corresponding to the number of sub-carriers can be expressed, the maximal flexibility is obtained in the expression of the sub-carrier set. However, in this case, signaling overhead increases.

If needed, the S, R, or N value can be limited. For example, the R or N value can be limited to only a power of 2.

Second Example of First Exemplary Embodiment

In the second example of the first exemplary embodiment, the flexibility of a sub-carrier set mapped to allocated resources and the signaling overhead are simultaneously considered.

Figure 9:
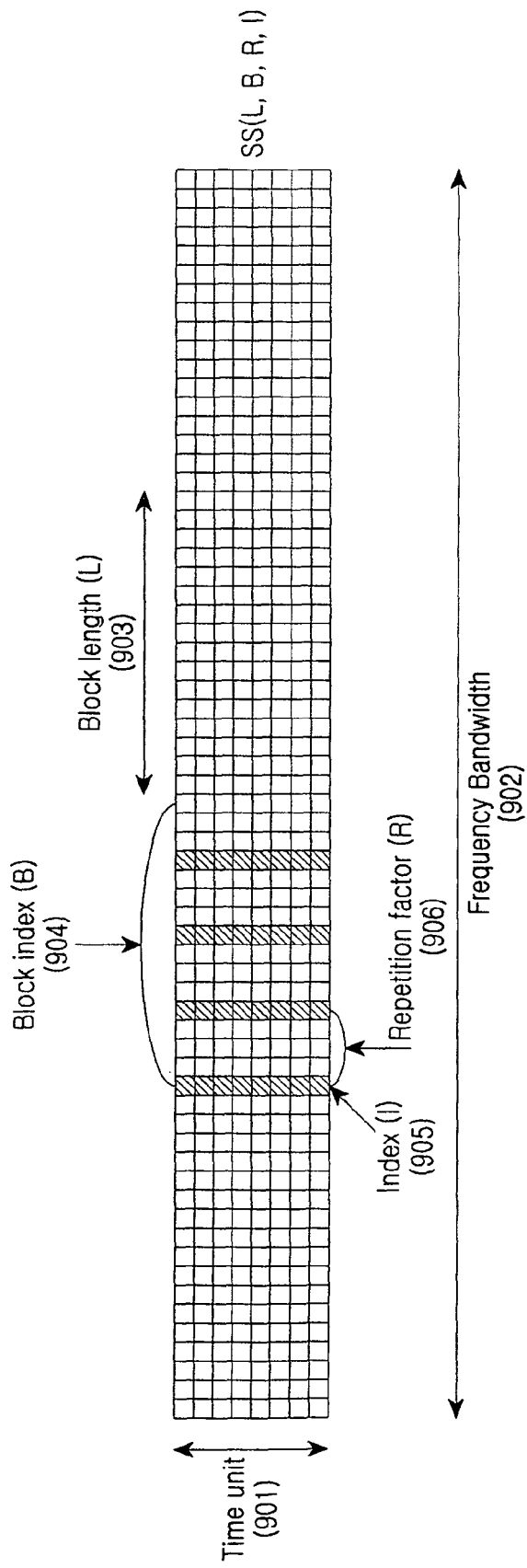
FIG. 9 illustrates a second example of the first exemplary embodiment.

FIG. 9 illustrates a basic concept of the second example of the first exemplary embodiment.

In FIG. 9, reference numeral 900 denotes uplink resources on time and frequency domains. In the time domain, a time unit is designated as indicated by reference number 901 and is used as a scheduling unit.

One or more OFDM symbols can be set in one time unit. Furthermore, the frequency bandwidth is configured with multiple sub-carriers as indicated by reference numeral 902. That is, the base station signals a set of allocated sub-carriers to each terminal in every time unit.

In relation to the sub-carrier set in a signaling method, a total frequency bandwidth is divided into frequency blocks with a block length (L) 903, and sub-carriers are transmitted only in the blocks. When the total frequency bandwidth is divided into the frequency blocks, a block index (B) 904 of a used frequency block is set. Sub-carriers to be used in the designated frequency block may differ according to an interval between sub-carriers. When the interval between sub-carriers (R) 906 is designated, the number of sub-carriers with the designated interval is set to a regular value. Thus, an index (I) 905 can be defined in a sub-carrier set.

Because the interval (R) 906 between sub-carriers is set to one value in a resource set allocated to an arbitrary terminal, the DFDMA using equal-interval sub-carriers can be supported. When the interval R is set to 1, the LFDMA using successive sub-carriers can be supported.

In other words, one method can support both DFDMA and the LFDMA. For convenience, a sub-carrier set allocated to a terminal is expressed by SS(L, B, R, I).

Figure 10:
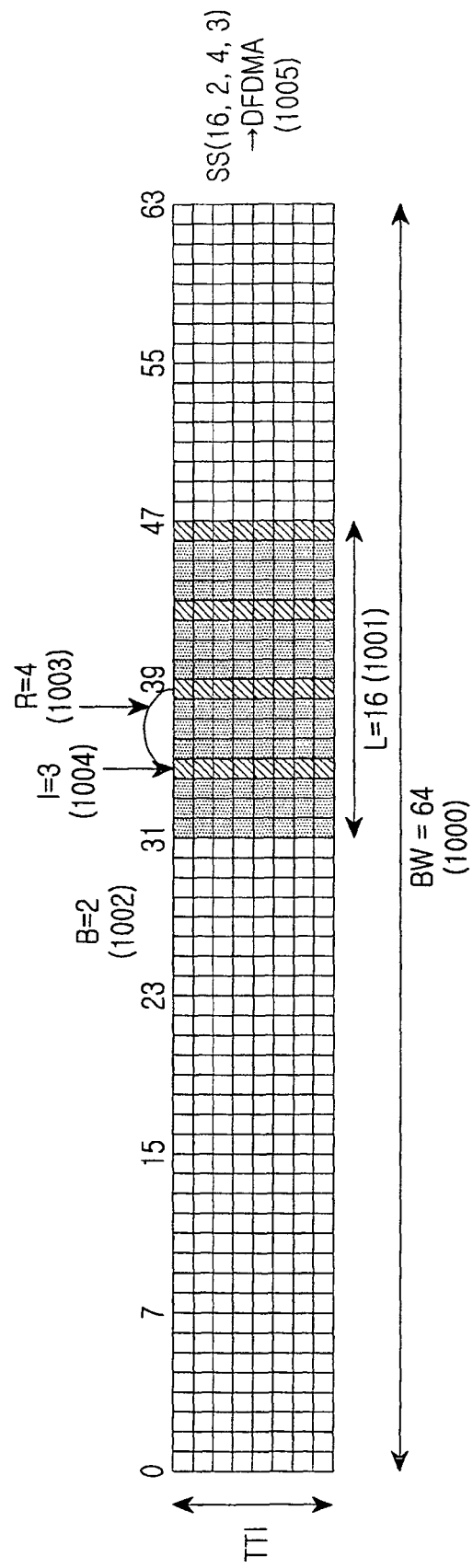
FIGS. 10 and 11 illustrate examples of expressing a sub-carrier set using the second example of the first exemplary embodiment.
Figure 11:
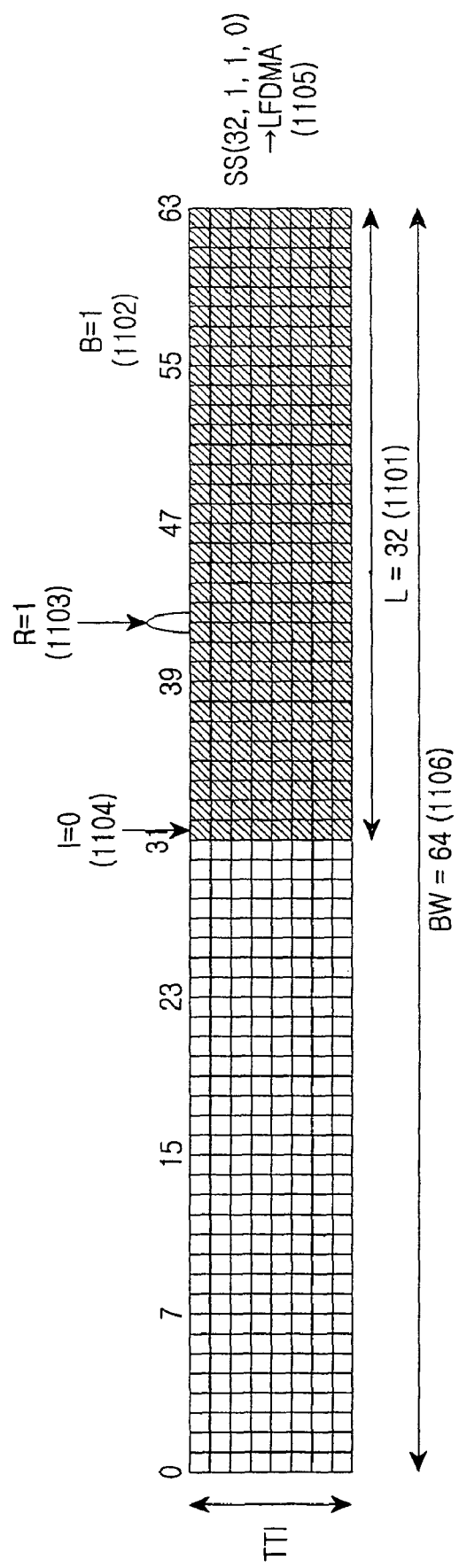

FIGS. 10 and 11 illustrate examples of expressing a sub-carrier set using the second example of the first exemplary embodiment.

FIG. 10 illustrates an example of using DFDMA.

Referring to FIG. 10, reference numeral 1001 denotes a length L of a frequency block in which a sub-carrier set is positioned. In FIG. 10, for example, for example, 16 sub-carriers of 64 sub-carriers 1000 are one frequency block in the total frequency bandwidth. The number of sub-carriers may differ according to size of the frequency bandwidth. The number of frequency blocks whose length value is 16 is set to 4, and the four frequency blocks can sequentially have indices. As indicated by reference numeral 1002 of FIG. 10, B=2 in the third frequency block, where the B value starts at 0. As indicated by reference numeral 1003, an interval R between sub-carriers within the frequency block is set to 4.

If the length L and the index B of the frequency block and the interval R between sub-carriers are set, the number of sub-carrier sets capable of being allocated is set to 1 or more.

In FIG. 10, the total number of sub-carrier sets capable of being currently allocated becomes 4.

An index of the first sub-carrier in the sub-carrier set capable of being allocated can be defined. As indicated by reference numeral 1004 in FIG. 10, the sub-carrier set has the first sub-carrier mapped to the fourth position in which I=3, where the I value starts at 0. As a result, the sub-carrier set in FIG. 10 is expressed by SS(16, 2, 4, 3) as indicated by reference numeral 1005.

FIG. 11 illustrates an example of using LFDMA.

Referring to FIG. 11, reference numeral 1101 denotes a length L of a frequency block in which the sub-carrier set is positioned. In FIG. 11, for example, 32 sub-carriers of 64 sub-carriers are declared as one frequency block in the total frequency bandwidth 1106. The number of sub-carriers may differ according to size of the total frequency bandwidth. The number of frequency blocks whose length value is 32 is set to 2. As indicated by reference numeral 1102 of FIG. 11, B=1 in the second frequency block, where the B value starts from 0.

As indicated by reference numeral 1103, an interval R between sub-carriers within the frequency block is set to 1, such that the LFDMA expression is possible.

If the length and index of the frequency block and the interval between sub-carriers are set, the number of sub-carrier sets capable of being allocated is set to 1 or more. In FIG. 11, the number of sub-carrier sets capable of being currently allocated is set to 1.

An index of the first sub-carrier in the sub-carrier set capable of being allocated can be defined. As indicated by reference numeral 1004 in FIG. 11, the sub-carrier set has the first sub-carrier mapped to the first position in which I=0, where the I value starts from 0. As a result, the sub-carrier set in FIG. 11 is expressed by SS(32, 1, 1, 0) as indicated by reference numeral 1105.

When four information elements L, B, R, and I for expressing the sub-carrier set can express all values corresponding to the number of sub-carriers, a large flexibility can be achieved, but signaling overhead increases.

If needed, a value capable of being expressed among the above-described values can be limited. For example, when the following limitations are possible, the signaling overhead is significantly reduced.

First, the block length L is limited to a minimum of 16, and is set to only a power of 2. The interval between sub-carriers, R, is set to a maximum of 16 and is assumed as an arbitrary integer. Under the above-described assumption, a combination of the frequency block length L and the frequency block index B and a combination of the interval R between sub-carriers, and the sub-carrier set-related index I can be expressed.

TABLE 1

| Length L | Index B | x | Interval R | Index I |
|---|---|---|---|---|
| 512 | 0 | | 1 | 0 |
| 256 | 0, 1 | | 2 | 0, 1 |
| 128 | 0, 1, 2, 3 | | 3 | 0, 1, 2 |
| 64 | 0, 1, . . . , 7 | | 4 | 0, 1, 2, 3 |
| 32 | 0, 1, . . . , 15 | | . . . | |
| 16 | 0, 1, . . . , 31 | | 16 | 0, 1, . . . , 15 |
| 63 combinations (6 bits) → x | | | 136 combinations (8 bits) → y | |

Because the number of combinations of frequency block lengths and frequency block indices, x is 63 in Table 1, and the number of combinations of intervals between sub-carriers and sub-carrier set-related indices, y is 136 in Table 1, the number of all possible combinations is x*y=63*136.

This expression uses the combinations of frequency block lengths and frequency block indices, x, and the combinations of intervals between sub-carriers and sub-carrier set-related indices, y. When the base station transforms or encodes a value of x*y into an index of scheduling allocation information and transmits encoded information to the terminal, the terminal can interpret a sub-carrier set allocated by the base station. A range of the x or y value may differ according to limiting conditions for L, B, R, and I.

Second Exemplary Embodiment

In the second exemplary embodiment of the present invention, scheduling is performed using previously set combinations for uplink resources used in the DFDMA and the LFDMA through high-level signaling. A sub-carrier set allocated to the terminal is signaled through the scheduling.

Figure 12:
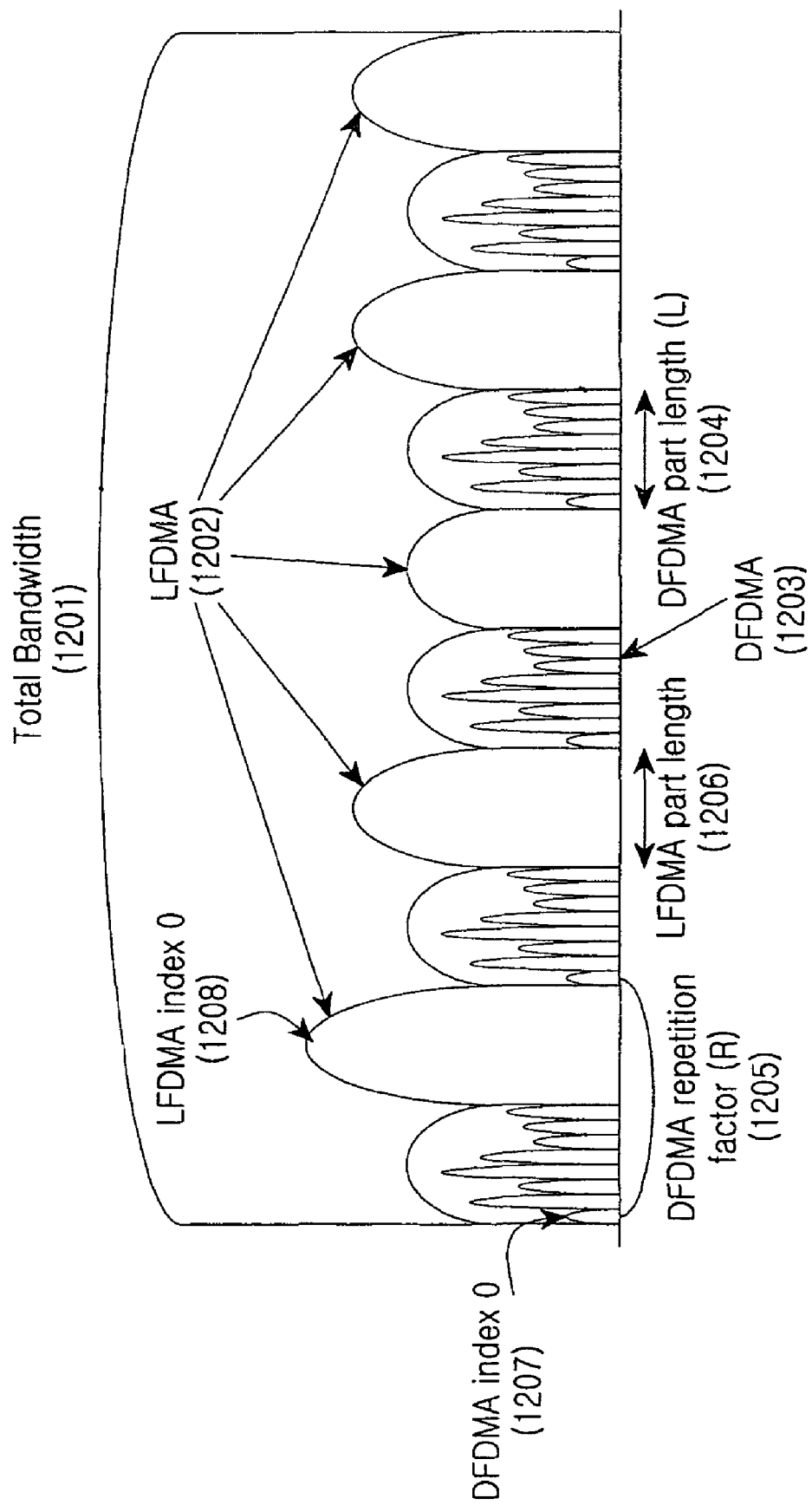
FIG. 12 illustrates a frequency domain and a resource signaling method in accordance with a second exemplary embodiment of the present invention.

FIG. 12 illustrates resource signaling methods on a frequency domain-by-frequency domain basis in accordance with the second exemplary embodiment of the present invention.

Referring to FIG. 12, a total frequency bandwidth 1201 is divided into frequency parts 1203 in which resources are used in DFDMA and frequency parts 1202 in which resources are used in the LFDMA. Through the high-level signaling, the base station and the terminal are notified in advance of information about the divided frequency bandwidth. Hereinafter, the frequency parts in which resources are used in the DFDMA or LFDMA are referred to as a frequency set.

When the frequency set is designated, states of terminals currently belonging to the base station are detected and a determination is made as to how much resources are required in the DFDMA. The DFDMA frequency set is first designated.

A method for designating the DFDMA frequency set uses a DFDMA sub-carrier repetition factor (R) 1205 and a length (L) 1204 of one frequency part of the DFDMA frequency set. Hereinafter, one frequency part of the frequency set is referred to as a sub-carrier set.

Herein, it is assumed that the DFDMA frequency set is distributed over the total frequency bandwidth to maximize the frequency diversity gain. Of course, a frequency bandwidth in which the DFDMA frequency set is positioned can be set to a particular frequency bandwidth. Under assumption that the DFDMA is present over the total frequency bandwidth, the DFDMA frequency set is designated using only a DFDMA repetition factor R and a length L of DFDMA sub-carrier set. Thus, the remaining frequency parts are determined as LFDMA sub-carrier sets having a LFDMA part length 1206. Furthermore, DFDMA indices are sequentially and automatically assigned to DFDMA sub-carrier sets. Similarly, LFDMA indices are sequentially and automatically assigned to LFDMA sub-carrier sets. In the DFDMA frequency set of FIG. 12, a sub-carrier set with the first index includes sub-carriers as indicated by reference numeral 1207. In the LFDMA frequency set of FIG. 12, a sub-carrier set with the first index includes sub-carriers as indicated by reference numeral 1208.

On the other hand, a conventional LFDMA operation is performed when L=0 in FIG. 12. In this case, the "R" value can be set in advance.

Figure 13:
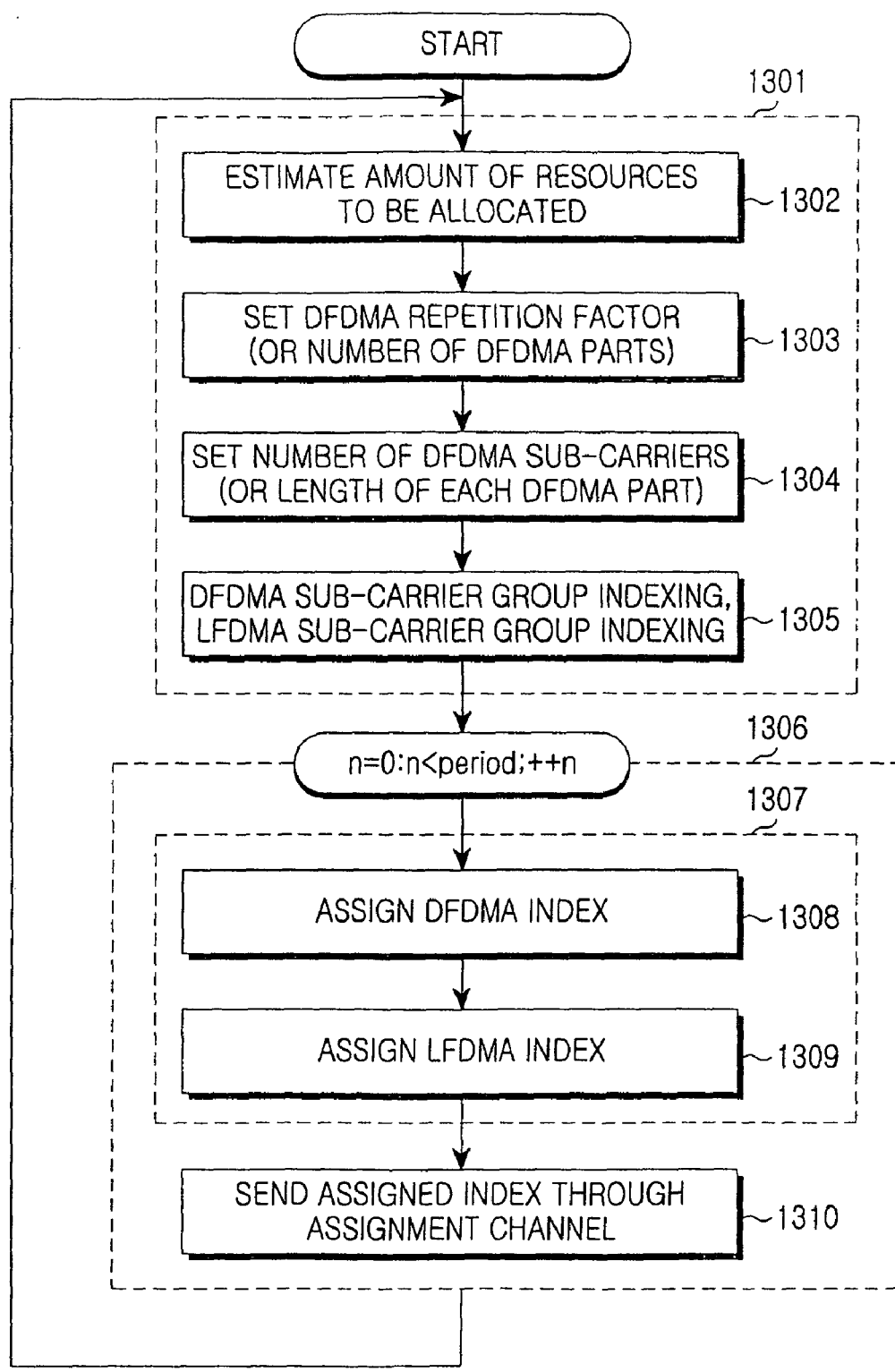
FIG. 13 is a flowchart illustrating an operational process of a base station in accordance with the second exemplary embodiment of the present invention.

FIG. 13 is a flowchart illustrating an operation process of a base station in accordance with the second exemplary embodiment of the present invention.

Referring to FIG. 13, when an uplink transmission is started, the base station divides frequency resources and sets DFDMA and LFDMA resources (Step 1301).

After states of terminals currently belonging to the base station and an amount of resources required later are determined (Step 1302), a value of a repetition factor R of a DFDMA sub-carrier set or a number of DFDMA parts is designated (Step 1303).

Subsequently, the length L of the DFDMA sub-carrier set, or in other words, the number of sub-carriers of the DFDMA sub-carrier set, is designated (Step 1304). Thus, a DFDMA sub-carrier set or group and an LFDMA sub-carrier set or group are automatically indexed (Step 1305).

Next, the base station schedules DFDMA and LFDMA resources predefined within a scheduling interval (Step 1307). That is, an index of a DFDMA sub-carrier set is assigned to a terminal requiring the DFDMA (Step 1308) and an index of an LFDMA sub-carrier set is assigned to a terminal requiring the LFDMA (Step 1309). Herein, the indices are indices that were automatically assigned in step 1305. Subsequently, the base station transmits an assigned index to the terminal using a scheduling assignment channel (Step 1310). At this time, transmitted information can include only one sub-carrier set index. When multiple sub-carrier sets are required, information about the number of sub-carrier sets and the first sub-carrier set can be transferred together.

The base station repeats a process of steps 1308 to 1310 in a interval (Step 1306). Herein, the interval is a period in which a setting process is performed in step 1301, such as in the interval defined by n=0:n<period; ++n.

The base station controls the uplink transmission by repeating the above-described process.

Also, the terminal receives resource allocation information including an index assigned from the base station, and detects its own allocated sub-carriers according to a known DFDMA repetition factor R and a known DFDMA sub-carrier set length L.

Figure 14:
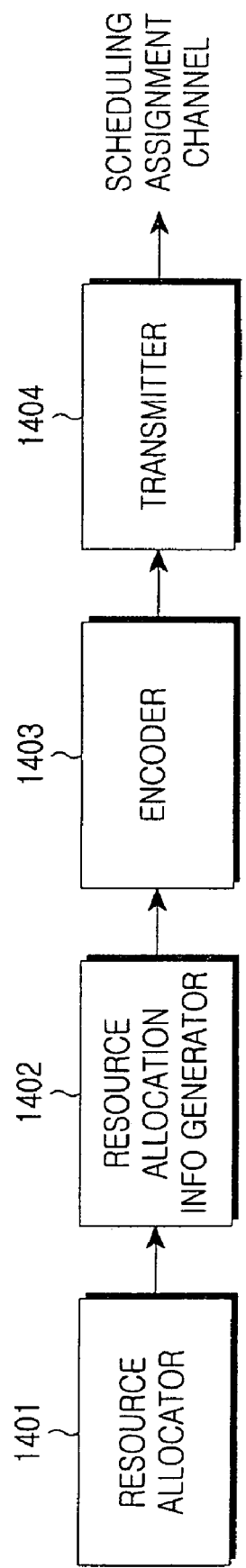
FIG. 14 is a block diagram illustrating a transmission apparatus of the base station for uplink packet control in accordance with an exemplary embodiment of the present invention.

FIG. 14 is a block diagram illustrating a transmission apparatus of the base station for uplink packet control in accordance with an exemplary embodiment of the present invention.

In FIG. 14, the transmission apparatus performs the operations corresponding to the first and second exemplary embodiments. The operations will be described with reference to FIG. 14.

Referring to FIG. 14, the transmission apparatus of the base station in accordance with the first exemplary embodiment is provided with a resource allocator 1401, a resource allocation information generator 1402, an encoder 1403, and a transmitter 1404. The resource allocator 1401 allocates uplink resources from the base station to each terminal on a frequency bandwidth-by-frequency bandwidth basis when the uplink transmission is required. The resource allocation information generator 1402 maps the allocated uplink resources to equal-interval sub-carriers or successive sub-carriers and generates resource allocation information for each terminal. The encoder 1403 encodes the resource allocation information for each terminal. The transmitter 1404 transmits the encoded resource allocation information to each terminal through a scheduling assignment channel.

Herein, the resource allocation generator 1402 maps resources to the equal-interval sub-carriers for terminals using DFDMA, and maps resources to the successive sub-carriers for terminals using LFDMA.

In the transmission apparatus of the base station in accordance with the second exemplary embodiment, the resource allocator 1401 divides uplink resources for respective terminals on a frequency bandwidth-by-frequency bandwidth basis and sets DFDMA and LFDMA resources when the uplink transmission is required. The resource allocation information generator 1402 allocates a DFDMA or LFDMA sub-carrier set index to each terminal requiring the DFDMA or LFDMA during a scheduling interval, maps the allocated index to sub-carriers, and generates resource allocation information for each terminal. The encoder 1403 encodes the resource allocation information for each terminal. The transmitter 1404 transmits the encoded resource allocation information to each terminal through a scheduling assignment channel.

Herein, the resource allocation information generator 1402 determines states of the terminals currently belonging to the base station and an amount of resources required later when setting frequency part indices. Further, the resource allocation information generator 1402 designates a value of a repetition factor R of the IFDMA sub-carrier set, and designates the number of sub-carriers of the DFDMA sub-carrier set, L. Thus, DFDMA and LFDMA sub-carrier sets are automatically indexed.

When the allocated index is transmitted to the terminal, information to be transmitted to the terminal could include only one sub-carrier index or both the number of sub-carrier sets and an index of the first sub-carrier set.

On the other hand, each terminal detects its own allocated frequency resources from the information transmitted through the scheduling assignment channel of the base station, and performs the uplink transmission to the base station using the frequency resources.

In an OFDM-based wireless communication system in accordance with exemplary embodiments of the present invention, DFDMA and LFDMA schemes can be efficiently allocated and allocation information can be signaled to terminals through a resource allocation method that takes into consideration flexibility and overhead.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A resource allocation method for an uplink packet data transmission in a wireless communication system based on Orthogonal Frequency Division Multiplexing (OFDM), comprising the steps of:
   allocating uplink resources from a base station to a plurality of terminals on a frequency bandwidth-by-frequency bandwidth basis;
   mapping the allocated resources to equal-interval sub-carriers or successive sub-carriers depending on a state of at least one of the plurality of terminals;
   generating resource allocation information for at least one of the terminals from the base station; and
   transmitting the generated resource allocation information from the base station to at least one of the terminals using a scheduling assignment channel,
   wherein the resource allocation information comprises an index (I) of a first sub-carrier allocated to at least one of the terminals, an interval (R) between sub-carriers, and the number (N) of sub-carriers.

2. The resource allocation method of claim 1, wherein the mapping step comprises the steps of:
   mapping resources allocated for one of the plurality of terminals using Distributed Frequency Division Multiple Access (DFDMA) to the equal-interval sub-carriers; and mapping resources allocated for another one of the plurality of terminals using Localized Frequency Division Multiple Access (LFDMA) to the successive sub-carriers.

3. A resource allocation method for an uplink packet data transmission in a wireless communication system based on Orthogonal Frequency Division Multiplexing (OFDM), comprising the steps of:
   allocating uplink resources from a base station to a plurality of terminals on a frequency bandwidth-by-frequency bandwidth basis;
   mapping the allocated resources to equal-interval sub-carriers or successive sub-carriers by considering a state of at least one of the plurality of terminals;
   generating resource allocation information for at least one of the plurality of terminals from the base station; and
   transmitting the generated resource allocation information from the base station to each terminal using a scheduling assignment channel,
   wherein the resource allocation information comprises a length (L) of a frequency block comprising multiple sub-carriers on which data is transmitted, an index (B) of the frequency block allocated to each terminal, an interval (R) between sub-carriers and an index (I) of a first sub-carrier within the frequency block allocated to each terminal.

4. The resource allocation method of claim 3, wherein the mapping step comprises the steps of:
   mapping resources allocated for at least one of the plurality of terminals using Distributed Frequency Division Multiple Access (DFDMA) to the equal-interval sub-carriers; and
   mapping resources allocated for at least another one of the plurality of terminal using Localized Frequency Division Multiple Access (LFDMA) to the successive sub-carriers.

5. A resource allocation method for an uplink packet data transmission in a wireless communication system based on Orthogonal Frequency Division Multiplexing (OFDM), comprising the steps of:
   dividing frequency resources into a Distributed Frequency Division Multiple Access (DFDMA) frequency set and a Localized Frequency Division Multiple Access (LFDMA) frequency set and performing settings, wherein each of the DFDMA and LFDMA frequency sets comprise a plurality of frequency blocks and each of the plurality of frequency blocks comprise a plurality of sub-carriers;
   allocating sub-carriers of the DFDMA frequency set or the LFDMA frequency set from a base station to at least one of a plurality of terminals; and
   transmitting resource allocation information relative to allocated resources from the base station to at least one of the plurality of terminals using a scheduling assignment channel.

6. The resource allocation method of claim 5, wherein the step of performing the settings comprises the steps of:
   determining a state of at least one of the plurality of terminals belonging to the base station and a required amount of resources;
   setting a repetition factor value (R) of a DFDMA frequency block;
   setting the number of sub-carriers (L) comprised in one DFDMA frequency block; and
   setting an index of each frequency block comprised in the DFDMA frequency set and the LFDMA frequency set.

7. The resource allocation method of claim 6, wherein the resource allocation information comprises index information about at least one of a DFDMA and LFDMA frequency block allocated to at least one of the plurality of terminals.

8. The resource allocation method of claim 5, wherein the allocating step comprises the step of:
   allocating a set DFDMA or LFDMA frequency block to at least one of the plurality of terminals until the base station newly sets the resources of the frequency domain to a new DFDMA frequency set and a new LFDMA frequency set.

9. The resource allocation method of claim 5, wherein the terminal is notified of the repetition factor value (R) and the number of sub-carriers (L) before the resource allocation information is transmitted.

10. An apparatus for transmitting uplink packet data in a wireless communication system based on Orthogonal Frequency Division Multiplexing (OFDM), comprising:
    an uplink resource allocator for allocating uplink resources from a base station to a plurality of terminal on a frequency bandwidth-by-frequency bandwidth basis;
    a resource allocation information generator for mapping the allocated resources to equal-interval sub-carriers or successive sub-carriers depending on a state of at least one of the plurality of terminals and generating resource allocation information for at least one of the plurality of terminals;
    an encoder for encoding the resource allocation information; and
    a transmitter for transmitting the encoded resource allocation information to at least one of the plurality of terminals using a scheduling assignment channel,
    wherein the resource allocation information comprises an index (I) of a first sub-carrier allocated to at least one of the plurality of terminals, an interval (R) between sub-carriers, and the number (N) of sub-carriers.

11. The apparatus of claim 10, wherein the resource allocation information generator maps resources allocated for at least one of the plurality of terminals using Distributed Frequency Division Multiple Access (DFDMA) to the equal-interval sub-carriers, and maps resources allocated for at least another one of the plurality of terminals using Localized Frequency Division Multiple Access (LFDMA) to the successive sub-carriers.

12. An apparatus for transmitting uplink packet data in a wireless communication system based on Orthogonal Frequency Division Multiplexing (OFDM), comprising:
    an uplink resource allocator for allocating uplink resources from a base station to a plurality of terminals on a frequency bandwidth-by-frequency bandwidth basis;
    a resource allocation information generator for mapping the allocated uplink resources to equal-interval sub-carriers or successive sub-carriers depending on a state of each of the plurality of terminals, and generating resource allocation information;
    an encoder for encoding the resource allocation information; and
    a transmitter for transmitting the encoded resource allocation information to at least one of the plurality of terminals using a scheduling assignment channel,
    wherein the resource allocation information comprises a length (L) of a frequency block comprising multiple sub-carriers on which data is transmitted, an index (B) of the frequency block allocated to at least one of the plurality of terminals, an interval (R) between sub-carriers and an index (I) of a first sub-carrier within the frequency block allocated to at least one of the plurality of terminals.

13. The apparatus of claim 12, wherein the resource allocation information generator maps resources allocated for at least one of the plurality of terminals using Distributed Frequency Division Multiple Access (DFDMA) to the equal-interval sub-carriers, and maps resources allocated for at least another one of the plurality of terminals using Localized Frequency Division Multiple Access (LFDMA) to the successive sub-carriers.

14. An apparatus for transmitting uplink packet data in a wireless communication system based on Orthogonal Frequency Division Multiplexing (OFDM), comprising:
   a resource allocator for dividing frequency resources into a Distributed Frequency Division Multiple Access (DFDMA) frequency set and a Localized Frequency Division Multiple Access (LFDMA) frequency set and performing settings, wherein each of the frequency sets comprises a plurality of frequency blocks and each of the plurality of frequency blocks comprises a plurality of sub-carriers;
   a resource allocation information generator for allocating sub-carriers of the DFDMA frequency set or the LFDMA frequency set to at least one of a plurality of terminals and generating resource allocation information for at least one of the plurality of terminals;
   an encoder for encoding the resource allocation information; and
   a transmitter for transmitting the encoded resource allocation information to at least one of the plurality of terminals using a scheduling assignment channel.

15. The apparatus of claim 14, wherein the resource allocator determines a state of at least one of the plurality of terminals belonging to the base station and a required amount of resources, sets a repetition factor value of a DFDMA frequency block and the number of sub-carriers comprised in one DFDMA frequency block, and sets indices of the DFDMA and LFDMA frequency blocks.

16. The apparatus of claim 15, wherein the transmitter transmits index information about at least one of a DFDMA and LFDMA frequency block allocated to at least one of the plurality of terminals.

17. The apparatus of claim 14, wherein at least one of the plurality of terminals is notified of a repetition factor value and the number of sub-carriers before the resource allocation information is transmitted.

18. The apparatus of claim 14, wherein the resource allocation information generator allocates a set DFDMA or LFDMA frequency block to at least one of the plurality of terminals until the base station newly sets the frequency resources to a new DFDMA frequency set and a new LFDMA frequency set.

19. The resource allocation method of claim 1, wherein the at least one of the plurality of terminals is each of the plurality of terminals.

20. The resource allocation method of claim 3, wherein the at least one of the plurality of terminals is each of the plurality of terminals.

21. The resource allocation method of claim 5, wherein the at least one of the plurality of terminals is each of the plurality of terminals.

22. The apparatus of claim 10, wherein the at least one of the plurality of terminals is each of the plurality of terminals.

23. The apparatus of claim 12, wherein the at least one of the plurality of terminals is each of the plurality of terminals.

24. The apparatus of claim 14, wherein the at least one of the plurality of terminals is each of the plurality of terminals.

* * * * *